United States Patent [19]

Rajendran

[11] Patent Number: 5,502,970
[45] Date of Patent: Apr. 2, 1996

[54] REFRIGERATION CONTROL USING FLUCTUATING SUPERHEAT

[75] Inventor: Natarajan Rajendran, Huber Heights, Ohio

[73] Assignee: Copeland Corporation, Sidney, Ohio

[21] Appl. No.: 435,833

[22] Filed: May 5, 1995

[51] Int. Cl.[6] .................................................. F25B 41/00
[52] U.S. Cl. .................................................. 62/115; 62/212
[58] Field of Search ............................ 62/212, 225, 115; 236/78 D

[56] References Cited

U.S. PATENT DOCUMENTS

| | | | |
|---|---|---|---|
| 4,067,203 | 1/1978 | Behr | 62/208 |
| 4,499,739 | 2/1985 | Matsuoka et al. | 62/212 |
| 4,523,435 | 6/1985 | Lord | 62/225 X |
| 4,545,212 | 10/1985 | Noda | 62/212 X |
| 4,617,804 | 10/1986 | Fukushima et al. | 62/212 |
| 4,674,292 | 6/1987 | Ohya et al. | 62/223 |
| 4,745,767 | 5/1988 | Ohya et al. | 62/211 |
| 4,807,445 | 2/1989 | Matsuoka et al. | 62/212 |
| 4,835,980 | 6/1989 | Oyanagi et al. | 62/212 |
| 4,845,956 | 7/1989 | Berntsen et al. | 62/225 |
| 4,848,100 | 7/1989 | Barthel et al. | 62/212 |
| 4,995,240 | 2/1991 | Barthel et al. | 62/225 |
| 5,000,009 | 3/1991 | Clanin | 62/115 |
| 5,036,680 | 8/1991 | Fujiwara et al. | 62/224 X |
| 5,050,393 | 9/1991 | Bryant | 62/115 |
| 5,117,645 | 6/1992 | Bryant | 62/225 X |
| 5,157,934 | 10/1992 | Uchida | 62/212 |
| 5,187,944 | 2/1993 | Jarosch | 62/225 |
| 5,224,354 | 7/1993 | Ito et al. | 62/210 |
| 5,259,210 | 11/1993 | Ohya et al. | 62/212 |
| 5,263,333 | 11/1993 | Kubo et al. | 62/160 |
| 5,355,692 | 10/1994 | Brownfield | 62/212 |

OTHER PUBLICATIONS

Wedekind, G. L. and Stoecker, W. F. "Theoretical Model for Predicting the Transient Response of the Mixture–Vapor Transition Point in Horizontal Evaporating Flow," *Journal of Heat Transfer*, Feb. 1968, pp. 165–174.

Primary Examiner—William E. Wayner
Attorney, Agent, or Firm—Harness, Dickey & Pierce

[57] ABSTRACT

The flow of refrigerant is controlled by a strategy that strives to seek and maintain a fluctuating superheat condition. The control system causes optimal use of the evaporator coil by ensuring that the refrigerant in the coil is in the liquid state. A temperature sensor at the evaporator coil exit senses refrigerant temperature and the control system regulates refrigerant flow so that the liquid dry out point (transition between liquid state and superheat state) occurs in the vicinity of this sensor. Thus a single sensor may be used to effect closed loop control.

21 Claims, 10 Drawing Sheets

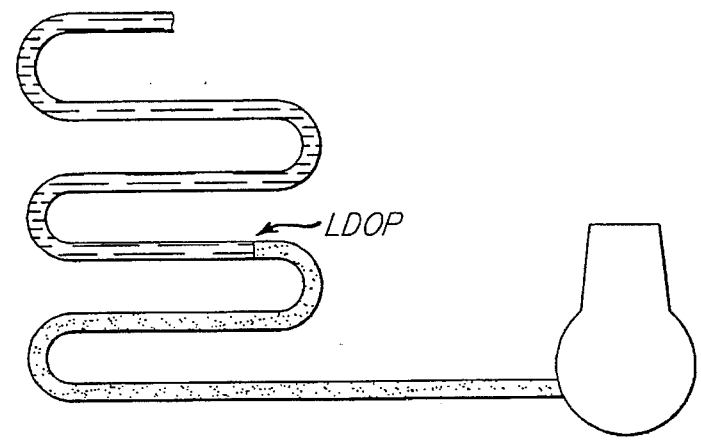
FIG. 3A.
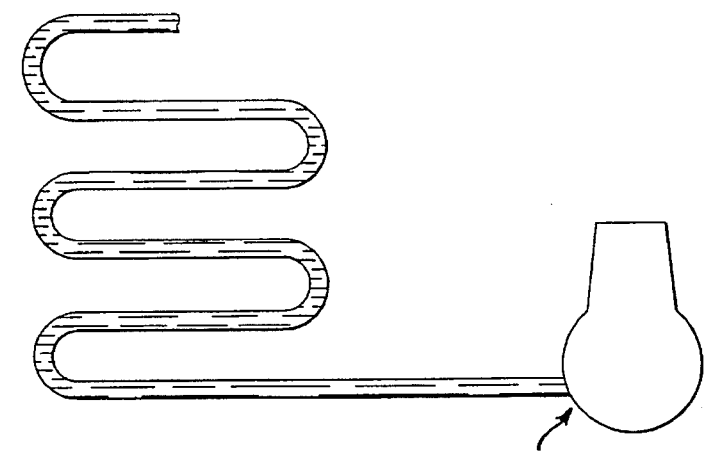
FIG. 3B. Flooding
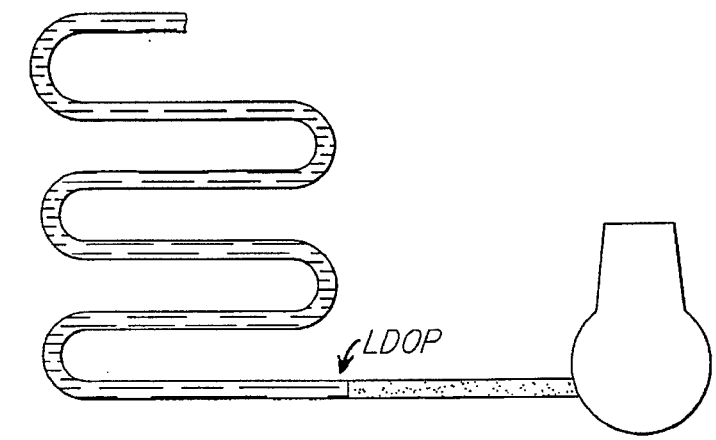
FIG. 3C.

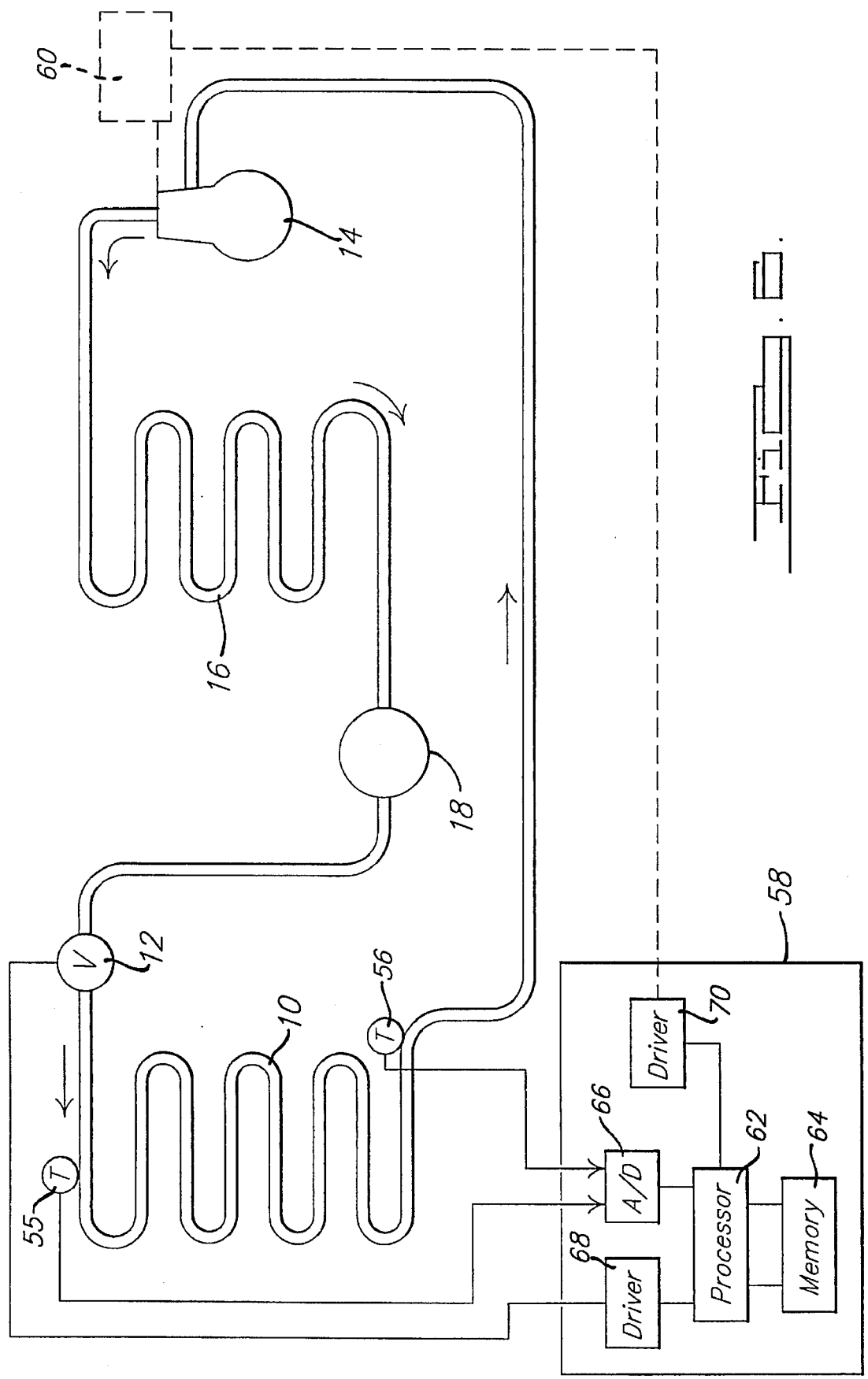

REFRIGERATION CONTROL USING FLUCTUATING SUPERHEAT

BACKGROUND AND SUMMARY OF THE INVENTION

The present invention relates generally to refrigeration control systems. More particularly, the invention relates to a control technique that senses refrigerant energy and uses the sensed refrigerant energy as a control parameter in a control system that strives to maintain the sensed refrigerant energy in a state of chaotic or random fluctuation. Using this technique very precise control of the refrigerant liquid-vapor phase transition is achieved, and the entire length of the evaporator coil may be used without risk of flooding the compressor.

Most modern-day refrigeration systems (e.g. refrigerators, freezers, refrigerated display cases, air-conditioners and heat pumps) use a form of closed-loop feedback control in which the temperature of the superheated refrigerant is held constant.

In a heat pump refrigeration system liquid refrigerant is introduced under pressure into a heat exchanger or evaporator coil, typically configured as a long serpentine conduit, often with external fins to increase the heat exchange surface area. A compressor or pump pressurizes the refrigerant and causes it to flow through the evaporator coil. As it flows through the evaporator coil, the refrigerant absorbs heat energy through the sidewalls of the heat exchanger. In a properly operating system the refrigerant absorbs heat continuously throughout its traverse through the heat exchanger, so that the heat energy of the refrigerant exiting the heat exchanger is greater than the heat energy of the refrigerant entering the heat exchanger.

As heat energy continues to accumulate in the refrigerant a phase change eventually occurs. When sufficient heat has been absorbed, the liquid refrigerant is converted to vaporous refrigerant. At the microscopic level, this transition from liquid phase to vapor phase does not occur instantaneously. Rather, there is a transition region characterized by a mixture of refrigerant in the liquid phase and refrigerant in the vapor phase occurring simultaneously. Eventually, however, when enough heat has been added, all of the refrigerant enters the vapor phase. When this occurs, the refrigerant is said to have entered the superheat domain or superheat region.

Conventional refrigeration systems attempt to monitor the temperature of the refrigerant within the superheat region, as a way of controlling the refrigeration cycle. If the measured superheat temperature is too low, then the control system reduces the flow of refrigerant. Conversely, if the measured superheat temperature is too high, the control system increases the flow of refrigerant. There is a significant problem in using superheat temperature as a control parameter in this fashion. The transition to the vapor phase that marks the beginning of the superheat region is not positionally stable. Depending on the instantaneous load or demand on the system, the transition point into the superheat region shifts position unpredictably. This makes it very difficult to reliably sense the instantaneous superheat temperature using a positionally fixed sensor, such as a thermistor placed in thermal contact with the sidewall of the refrigerant conduit. Because the superheat region fluctuates unpredictably, sometimes the superheat region will be positioned directly over the fixed sensor, and sometimes the superheat region will be upstream or downstream of the fixed sensor. Conventional refrigeration systems address this unpredictability by placing the sensor where it is assured to avoid the fluctuating region altogether. Conventional systems use a threshold temperature that is known to be well above the unpredictable range, so that the fixed sensor is guaranteed to always sense the superheat region. The disadvantage of using this technique is that the refrigerant makes its transition to the superheat region while it is still in the heat exchanger, thereby reducing the heat exchanger's efficiency.

The present invention takes a completely different approach. Rather than striving to avoid the unstable superheat region, the present invention is designed to seek it. By way of introduction, the present invention provides a system for controlling a refrigeration cycle of the type having a fluid refrigerant that changes state between a liquid phase at a first energy and a liquid phase at a second energy. The system comprises a flow control system for regulating the flow of refrigerant and a sensor system positioned for detecting a parameter indicative of refrigerant energy. The invention further employs a recognition system coupled to the sensor system for discriminating between an energy associated with a predominantly liquid phase and an energy associated with a predominantly vapor phase. The invention further comprises a control system, coupled to the recognition system and to the flow control system, for operating the flow control system so that the energy of the refrigerant at the sensor position fluctuates alternately between an energy associated with the predominantly liquid phase and an energy associated with the predominantly vapor phase.

One of the advantages of the invention is that the entire heat exchanger is used efficiently through a control strategy that maintains the refrigerant within the heat exchanger in a predominantly liquid phase. In addition, the control system of the invention also prevents refrigerant in the predominantly liquid phase from entering or flooding the compressor.

For a more complete understanding of the invention, its objects and advantages, refer to the following specification and to the accompanying drawings.

BRIEF DESCRIPTION OF THE DRAWINGS

FIG. 3A, 3B and 3C (collectively FIG. 3) are cross-sectional views of a refrigeration system useful in understanding fluctuation of the liquid dry out point;

FIG. 6 is a block diagram of the system of the invention, illustrated in a commercial refrigeration display case application;

FIG. 7 is a flowchart of the presently preferred recognition system algorithm and control algorithm;

FIG. 18 is a graph depicting valve flow rate as a function of valve position, useful in understanding the Load Change routine of the preferred embodiment.

DESCRIPTION OF THE PREFERRED EMBODIMENT

Figure 1:
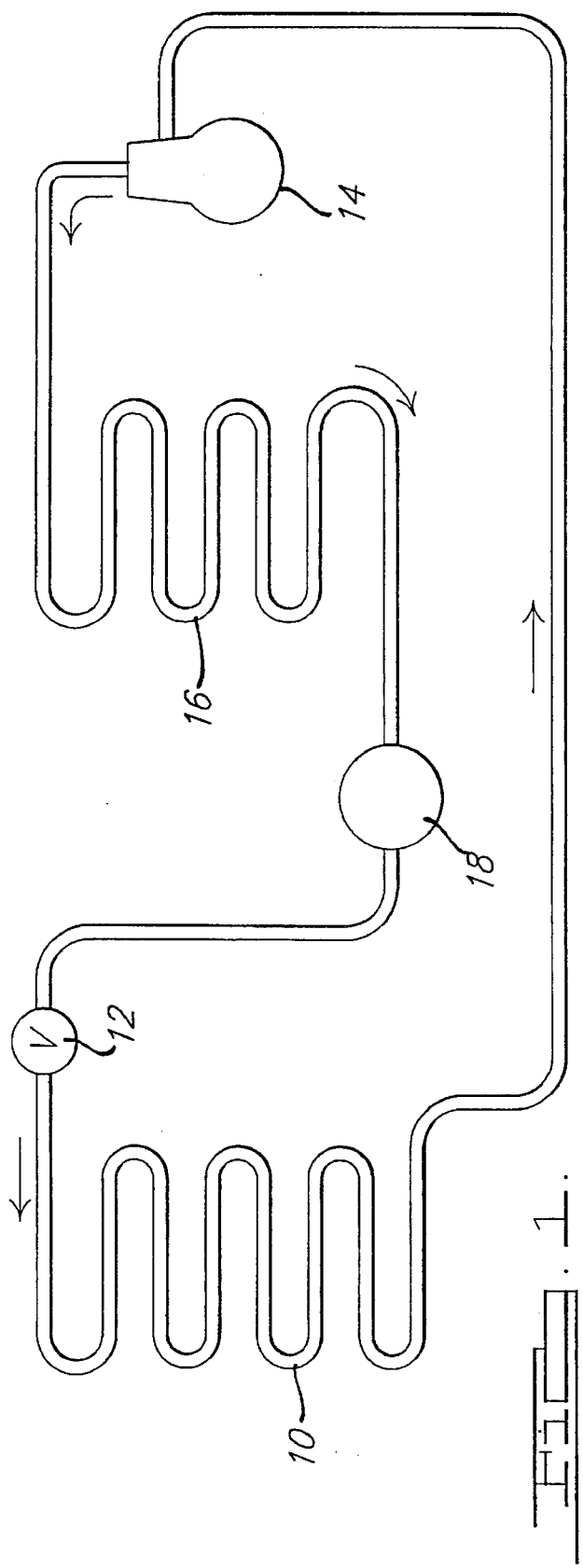
FIG. 1 is a schematic representation of the basic refrigeration cycle.

Before giving a detailed description of the preferred embodiment of the invention, a brief review of the refrigeration cycle will be presented. That cycle will be described in connection with a basic heat pump system illustrated schematically in FIG. 1.

The heat pump cycle uses the cooling effect of evaporation to lower the temperature of the surroundings near one heat exchanger (the evaporator) and it uses the heating effect of high pressure, high temperature gas to raise the temperature of the surroundings near another heat exchanger (the condenser). This is usually accomplished by releasing a refrigerant under pressure (usually in the liquid phase) into a low pressure region to cause the refrigerant to expand into a low temperature mixture of liquid and vapor. Commonly, this low pressure region comprises an evaporator coil, such as evaporator coil 10. Once in the evaporator coil 10, the refrigerant mixture is exposed to high temperature ambient air of the region desired to be cooled. Evaporation of refrigerant from liquid to gas absorbs heat from the ambient air and thereby cools it.

Release of refrigerant into the low pressure evaporator coil is usually metered by a restricted orifice or valve commonly called an expansion valve 12. There are a wide variety of different types of restricted orifices and expansion valves in use today, ranging from simple nonadjustable capillary tubes to electrically adjustable valves, such as pulse width modulated valves and stepper motor valves.

The refrigerant at the output of the evaporator coil is compressed back into a high pressure state by compressor 14 and is condensed into a liquid phase by condenser 16 so that it may be used again. In some systems the compressor 14 may be variable speed or variable capacity, so that the compressor also controls the rate at which refrigerant flows through the restricted orifice. If desired the liquid refrigerant can be collected in a sump 18.

Figure 2:
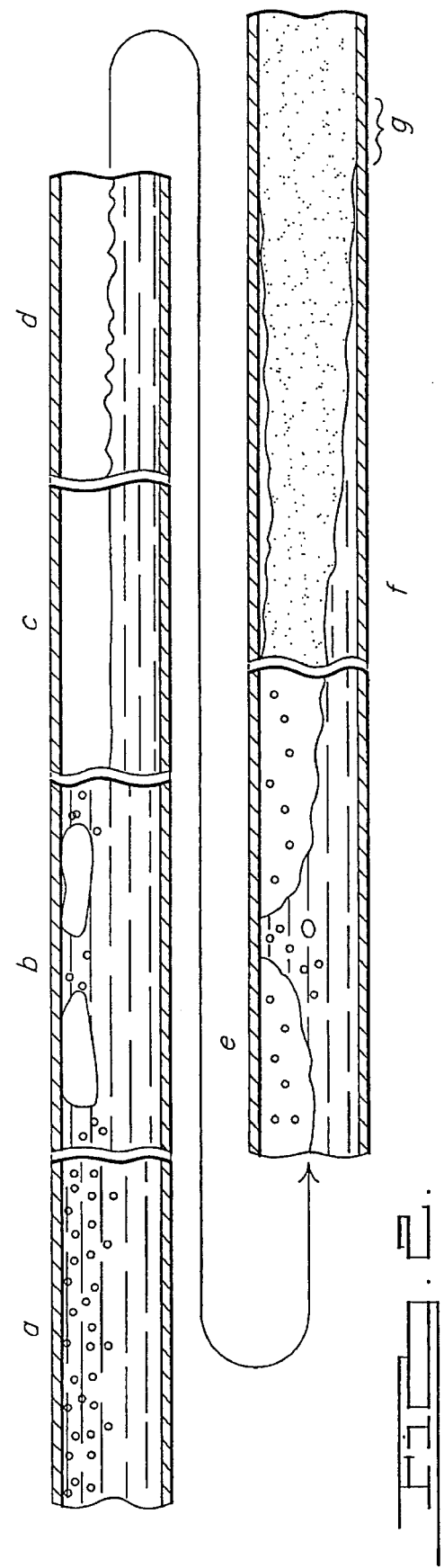
FIG. 2 is a cross-sectional view of the refrigeration conduit, illustrating the transition from liquid phase to vapor phase.

FIG. 2 shows the refrigerant flow pattern that develops as the refrigerant acquires heat in the horizontal evaporator coil and ultimately makes a transition from liquid to vapor. Referring to FIG. 2, a section of the evaporator coil 10 has been illustrated. Specifically, a portion adjacent the exit end of the coil has been illustrated, in magnified form, to show how the refrigerant changes state as heat is absorbed.

In Region a the refrigerant is principally in the liquid phase with some suspended bubbles of refrigerant in the vapor phase. The bubbles tend to flow along the top of the coil, as illustrated. As heat is absorbed, the refrigerant gradually exhibits the flow illustrated in Region b. In Region b bullet-shaped bubbles form and tend to move along the top of the coil as illustrated. As the flow proceeds to Region c, the refrigerant enters a stratified flow regime, characterized by liquid refrigerant flowing along the bottom of the coil and vapor refrigerant flowing along the top. As further heat energy is absorbed by the refrigerant, the liquid refrigerant develops waves as depicted in Region d. These waves are formed on the liquid/vapor interface due to the increased velocity of the vaporous refrigerant. Next, a slug flow regime develops as illustrated in Region e. The waves in the liquid refrigerant grow large enough to touch the upper surface of the coil, with large frothy slugs of liquid interspersed with regions of stratified liquid flow. Finally, in Region f virtually all of the refrigerant is in the vapor phase and the flow becomes annular. The liquid refrigerant adheres to the sidewall is of the coil, with a greater quantity present at the bottom of the coil due to gravitational effects. The liquid dry out point or "burn-out" point occurs when the liquid phase adhering to the sidewalls substantially disappears. The liquid dry out point is illustrated generally at Region g in FIG. 2.

The precise location of the liquid dry out point will shift randomly or erratically back and forth (left to right in FIG. 2) as the refrigeration apparatus operates. This makes direct sensing of the superheat temperature difficult in conventional systems. If a temperature sensor is placed near the liquid dry out point (such as at Region g), the conventional system will malfunction, because the liquid dry out point moves back and forth so that sometimes the temperature sensor measures superheated vapor and other times measures liquid refrigerant. This presents problems because the control system must be calibrated to control. refrigerant flow based on the assumption that the temperature sensor is always measuring refrigerant in the same fluid state. According to thermodynamic laws, refrigerant in the liquid phase remains at essentially the boiling point temperature, whereas refrigerant in the vapor phase can be superheated to temperatures above the boiling point temperature.

To address this problem, conventional refrigeration system design dictates placing the temperature sensor well past the liquid dry out point, so that the sensor is guaranteed to sense refrigerant in the vapor phase at all times during normal operation. In other words, in FIG. 2, the temperature sensor for a conventional system would be placed well to the right of Region g. Thus as the liquid dry out point shifts back and forth, the conventional temperature sensor always remains in a vapor-only region. The drawback of this approach is that during much of the normal operation part of the evaporator coil will contain refrigerant in the vapor-only phase. This degrades efficiency because vapor phase refrigerant does not extract heat as efficiently as liquid phase refrigerant. Optimal efficiency is achieved when the entire evaporator coil is substantially filled by liquid phase refrigerant. In the conventional refrigeration system the optimal condition will occur only sporadically, when the liquid dry out point happens to be precisely at the exit end of the evaporator coil.

The present invention takes an entirely different approach to refrigeration flow control. Instead of striving to maintain a constant superheat temperature of refrigerant in the vapor phase, the invention strives to maintain a continually fluctuating (i.e., nonconstant) condition. This is accomplished in the preferred embodiment by placing a temperature sensor at a location near the exit of evaporator coil where the liquid dry out point frequently occurs or is desired. Then, rather than striving to maintain a constant temperature at the sense point, the control system strives to maintain a fluctuation temperature at the sense point. The fluctuating temperature corresponds to the temperature difference to the left and to the right of the liquid dry out point, as the liquid dry out point fluctuates.

By controlling the refrigerant flow so that a fluctuating condition persists at the sense point, the system is, in effect, controlling the position of the liquid dry out point. By doing this, the invention is able to ensure that the evaporator coil remains full of substantially liquid refrigerant throughout its entire length. Thus optimal efficiency is achieved.

To further illustrate, FIGS. 3A–3C show, respectively, the inefficient condition that occurs when the liquid dry out point LDOP occurs prematurely within the evaporator coil (FIG. 3A), where the liquid dry out point occurs too late resulting in compressor flooding (FIG. 3B) and optimal operation where the liquid dry out point LDOP occurs at the exit end of the evaporator coil (FIG. 3C). The present invention strives to maintain an optimal condition as depicted at FIG. 3C, whereas conventional control systems merely strive to prevent the flooding condition depicted at FIG. 3B and often achieves the result illustrated at FIG. 3A.

Figure 4:
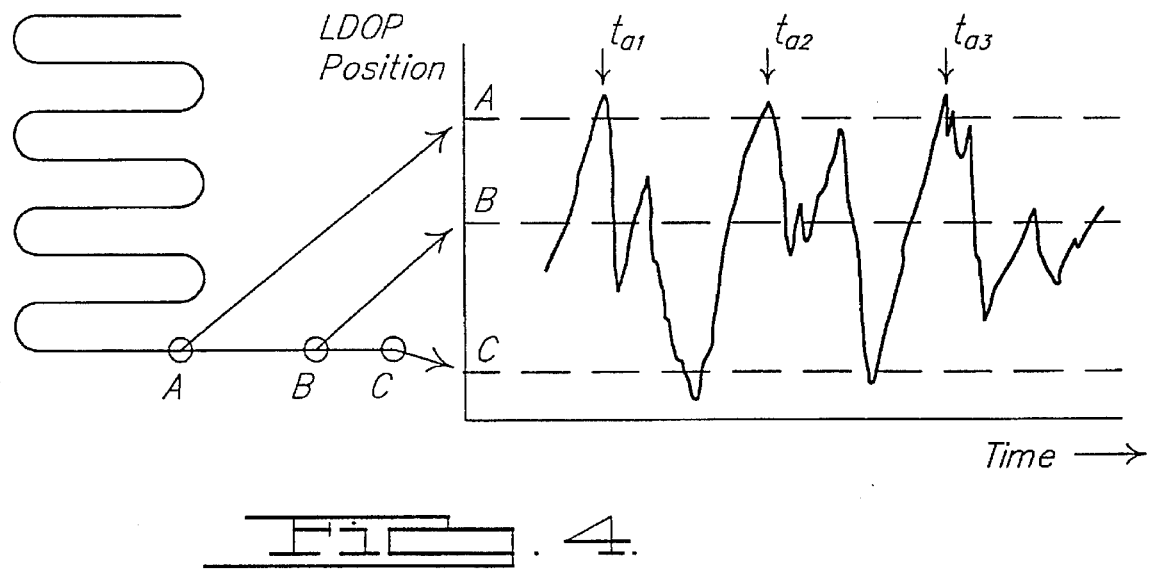
FIG. 4 is a graph depicting the manner in which the axial position of the liquid dry out point shifts as a function of time.

FIG. 4 graphically depicts the way in which the liquid dry out point fluctuates over time. In FIG. 4, which is merely exemplary, the liquid dry out point occurs at location A, for example, in a sporadic or random fashion illustrated $t_{a1}$, $t_{a2}$ and $t_{a3}$.

The present invention seeks to capitalize on this random fluctuation through a control strategy that discriminates between the energy associated with a predominantly liquid phase and the energy associated with a predominantly vapor phase. This is accomplished by placing the temperature sensor in a location adjacent the exit end of the evaporator coil where it will experience phase change fluctuation. This is illustrated in FIG. 5.

Figure 5:
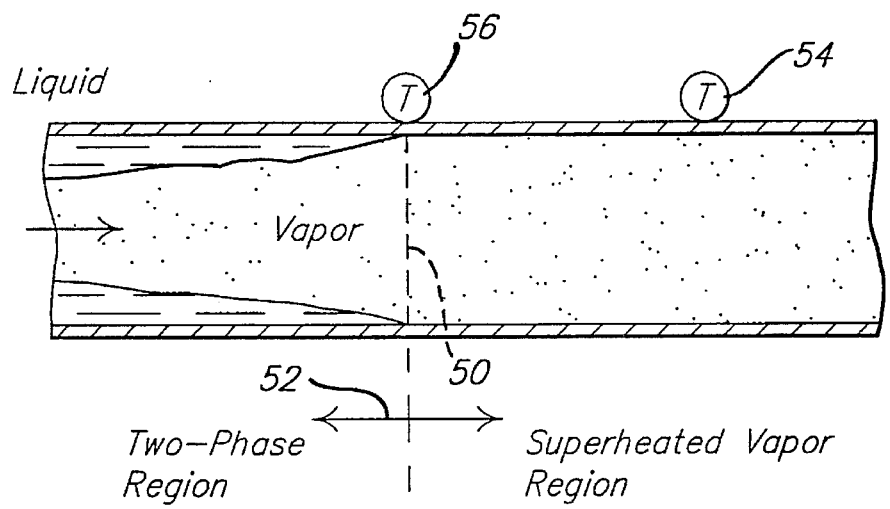
FIG. 5 is a cross-sectional view illustrating the placement of the liquid dry out point according to the teachings of the present invention.

In FIG. 5 a cross-sectional view of a portion of the evaporator coil conduit adjacent the exit end is illustrated. Two separate regions are illustrated, separated by the dashed vertical line 50. The region to the left of vertical line 50 is a two-phase region, having liquid refrigerant adhering to the sidewalls and vaporous refrigerant in the center. To the right of vertical line 50 is the superheated vapor region, containing only refrigerant in the vapor phase. Refrigerant flow is from left to right in FIG. 5. In FIG. 5 the liquid dry out point occurs along vertical line 50. The expected range of liquid dry out point fluctuation is depicted by double-headed arrow 52. In a typical application, the fluctuation could be as much as 1 foot or more on either side of vertical line 50.

To avoid the effects of random fluctuation, the conventional minimum stable superheat system places its temperature sensor at 54. This is well inside the superheated vapor region where the liquid dry out point will not occur in normal operation. The present invention places its temperature sensor at 56, essentially directly in the center of the fluctuation region. In this regard, the location of the fluctuation region can be determined quite readily by simple experiment for a refrigeration system of a given size and geometry. For example, a series of thermistors may be placed at longitudinally spaced locations along the exit end of the evaporator coil and data collected over a range of operating conditions. The thermistor location that exhibits the most fluctuation may be selected as the location for placing temperature sensor 56. Thereafter, systems having similar size and geometry may be manufactured using the same determined location for the temperature sensor.

FIG. 6 shows the control system configuration to implement the preferred embodiment of the refrigeration control system. In FIG. 6 the evaporator coil 10, electrically controlled expansion valve 12, compressor 14, condenser coil 16 and sump 18 are plumbed in the usual fashion. Expansion valve 12 is preferably an electrically actuated valve, such as a stepper motor valve that is capable of achieving a range of settings from fully open to fully closed. Although the stepper motor valve is presently preferred, pulse width modulated valve may also be used.

In the preferred embodiment the valve 12 is adjusted to control the amount of refrigerant flowing through the system. This adjustment is performed by the controller circuit 58. Circuit 58 is coupled to temperature sensor 55, positioned at the coil inlet, and temperature sensor 56, which is positioned as described above in reference to FIG. 5. The presently preferred embodiment is designed to work with a fixed capacity system in which compressor 14 operates at a single capacity, i.e., at a single speed.

If desired, however, controller circuit 58 can be coupled to a variable capacity system, which may be implemented by providing compressor 14 with a variable speed controller 60. The controller 60 is shown as a dotted box in FIG. 6. There are a number of different ways to implement the variable capacity controller. These include a variable frequency drive system that causes compressor 14 to operate at different speeds corresponding to the different AC frequencies generated. Alternatively, the compressor 14 may be designed to work at discrete stages or discrete capacities. In this case variable capacity controller 60 may be an interface to the compressor contactor that selects the appropriate contacts to operate the compressor at the desired capacity setting.

Controller circuit 58 is preferably a microprocessor-based circuit, that includes processor 62 and its associated memory 64. An analog-to-digital converter 66 is provided to convert the output of temperature sensor 56 to a digital form used by processor 62. A driver circuit 68 is provided for operating the expansion valve 12. This may be, for example, an interface circuit connecting to the appropriate terminals of the stepper motor that drives the valve. If a variable duty cycle valve is employed, the driver 68 may supply a variable duty cycle square wave signal or chopper signal suitable for controlling the valve. Also, as illustrated, controller circuit 58 may also include a driver 70 for interfacing with the variable capacity controller 60.

Processor 62 is programmed to perform the fluctuating superheat control strategy that is depicted in the flowchart of FIG. 7. FIG. 7 gives an overview of the control strategy, showing the major software modules involved. These modules are then further described in the pseudocode listings in the ensuing flowchart diagrams.

Referring to FIG. 7, the control strategy is as follows. Beginning at step 100 a settling timer is started. The settling timer is used to take into account the fact that an actual refrigeration system does not respond instantaneously to changes in refrigerant flow. The settling timer is used to take into account the physical system response time. In a typical refrigeration case, for example, a settling timer on the order of 20 seconds may be appropriate. This settling time may be adjusted, as explained below, under certain operating conditions.

The settling time is used to cause the control program to loop repeatedly through steps 102–108. Specifically, step 110 tests whether the settling time is expired. If not, then control continually loops through steps 102–108.

In step 102 the control program optionally performs a defrost routine. The defrost routine can be implemented in a number of different ways. Typically, the normal expansion valve control routine (or other flow control routine) is suspended while defrosting mechanisms are turned on. Although the periodic defrost routine 102 is shown in the control loop between steps 100 and 110, the defrost routine is not essential to the fluctuating superheat control strategy. The defrost routine is illustrated here only to show an example of how an actual system may be configured using the fluctuating superheat technique of the invention.

Step 104, designated Rest Valve, is provided in the preferred embodiment to allow external control over the fluctuating superheat control routine. In an actual working system there may be reasons to shut down the fluctuating superheat control mechanism, such as in the event of a component failure or operator selected shutdown command. Step 104 provides the control point to allow an external command to cause the control loop between steps 100 and 110 to prematurely terminate. Typically, in the Rest Valve state the valve is placed in a resting condition with no power applied. The Rest Valve step 104 is illustrated here simply to show how an actual working embodiment of the invention may be implemented. The fluctuating superheat control mechanism can be implemented without this step.

The fluctuating superheat control system uses a sensor system that is positioned to detect a parameter indicative of refrigerant energy. In the presently preferred embodiment the sensed parameter is temperature, although other parameters, such as pressure, may alternatively be used. At step 106 the temperature sensors are interrogated to detect the temperature parameters used in assessing the refrigerant energy. The presently preferred embodiment measures the inlet and outlet temperatures of the evaporator coil using temperature sensors 55 and 56. In addition, the conditioned ambient air temperature may also be measured. In a refrigeration case application, the conditioned ambient temperature may be the case air temperature. In an airconditioning system, the conditioned ambient temperature may be the temperature read by the room thermostat. These three measured temperatures are used by the control program to make various refrigerant flow control decisions as will be more fully described below.

Briefly, the evaporator coil outlet temperature is the primary temperature used in maintaining the fluctuating superheat condition according to the invention. The evaporator coil inlet temperature serves as the reference temperature from which the outlet temperature is subtracted to ascertain the superheat value. The conditioned ambient air temperature serves as the primary indicator of system demand.

After the input values are measured at step 106, a Min/Max routine 108 is performed. This routine tracks the instantaneous fluctuations in evaporator coil outlet temperature or superheat, detecting whether that temperature is rising or falling, and how rapidly. As will be more fully explained, under certain conditions, the settling timer that controls loop 102–108 may be overridden by the Min/Max routine. Essentially, the Min/Max routine detects when the control point is beginning to drift too rapidly away from or towards the fluctuating superheat region. When this condition is detected, the Min/Max routine aborts the settling timer and causes the control program to branch to the flow control decision logic.

Unless aborted by the Min/Max routine, the program continues to loop through steps 102–110 until the settling timer has expired. When the timer expires, step 110 detects this and diverts control to step 112. Step 112 is a calibration routine, referred to as Load Change. The presently preferred flow control procedure adjusts the setting of the expansion valve according to a series of calculations that will be described more fully below. These calculations produce a composite value indicative of a plurality of different factors. This composite value is then multiplied by the current valve setting to ascertain the new valve setting. In the presently preferred embodiment a stepper motor expansion valve is used. The stepper motor valve moves from fully closed to fully open over a range of incremental steps. The number of steps will, of course, depend on the particular valve selected. Load change routine 112 is responsible for ascertaining the current valve position and assigning a value to that position. The assigned value is then used in subsequent steps to compute the number of steps required to achieve the new valve setting. The precise details of the load change procedure will depend on the physical parameters of the valve being used. The presently preferred embodiment is described here.

The load change routine represents the relationship between valve flow rate and valve setting. The presently preferred system uses an Alco stepper motor valve, although other types of valves may also be used. Typically, the flow rate versus valve setting relationship is not a linear one. FIG. 18 illustrates the relationship for a typical stepper motor expansion valve. Note that the slope of the flow rate versus valve step curve is steeper at small valve settings and gradually relaxes to a more shallow slope at higher valve settings. In a typical embodiment the system designer will normally underutilize the full capacity of the valve under steady-state conditions, to leave some overcapacity to achieve high flow rates during initial pull-down. The presently preferred system scales the valve step range so that "fully open" under normal operating conditions is about half of the valve true fully open capacity. This leaves the additional capacity in reserve for rapid pull-down.

As the system operates the valve setting will normally fluctuate open and closed by varying degrees to meet the fluctuating superheat control requirements. Since it is the refrigerant flow rate that is being controlled, the valve setting must be selected to achieve the desired flow rate based on the relationship illustrated in FIG. 18. The presently preferred load change routine, described in the Appendix under the heading "Load Change," produces a valve setting value TS that represents the current valve setting. This TS value is scaled by the load change routine to take into account the fact that the flow rate versus valve step relationship is not linear. The presently preferred embodiment forces the TS value to be within the predefined normal operating range of the valve (e.g. between 20 steps and 75 steps), but otherwise selects the TS value based on the actual valve position.

The TS value is multiplied by composite multiplier factor in a subsequent control logic routine 114 to generate the actual valve movement amount.

After ascertaining the current valve position the procedure next performs the control logic routine 114. The control logic routine is primarily responsible for analyzing the detected refrigerant energy parameters (measured at step 106) to recognize the fluctuating superheat condition. The control logic routine is also responsible for determining what valve setting adjustment may be required to keep the system operating in the fluctuating superheat regime. The presently preferred control logic routine monitors not only the instantaneous superheat value, but also the rate of change (or first derivative) of that value. The presently preferred control logic routine uses a fuzzy logic analytical engine to ascertain the composite multiplier that determines the new valve setting. Although the fuzzy logic procedure is presently preferred, the invention can use other types of decision processing designed to recognize and seek the fluctuating superheat region.

After the control logic routine has completed its determination, control proceeds to step 116 where any change in valve position is performed. The valve position may be adjusted to a more open setting, to a more closed setting or held constant, depending on the results of step 114. In the presently preferred embodiment the ultimate valve setting change, if any, is the result of several aggregate factors that are each reflected by one term of the composite multiplier value. A1 though the invention is being illustrated using a stepper motor valve as the refrigerant flow control device, the invention can be applied to other flow control devices. These include pulse width modulated valve and variable speed or variable capacity compressors.

After the valve position is adjusted, as needed, at step 116, control proceeds to step 118 where the settling timer value is reset or loaded so that control may again proceed through the entire sequence, beginning at step 110. The presently preferred embodiment relies on a fixed settling timer on the order of 20 seconds (with premature abort provided by the Min/Max routine). This has been found quite suitable for a refrigeration case application. Generally speaking, the duration of the settling timer is selected based on the thermal response time of the system. Naturally, if tighter control is desired, a shorter settling time may be used. Also, if desired, the settling timer value can be adaptively adjusted during system operation. Thus, for example, if the Min/Max routine regularly aborts the settling timer during operation, step 118 can load a shorter settling time value in the settling timer.

Having described the overall control cycle, details of specific modules will be presented, beginning with the Min/Max routine.

Figure 8:
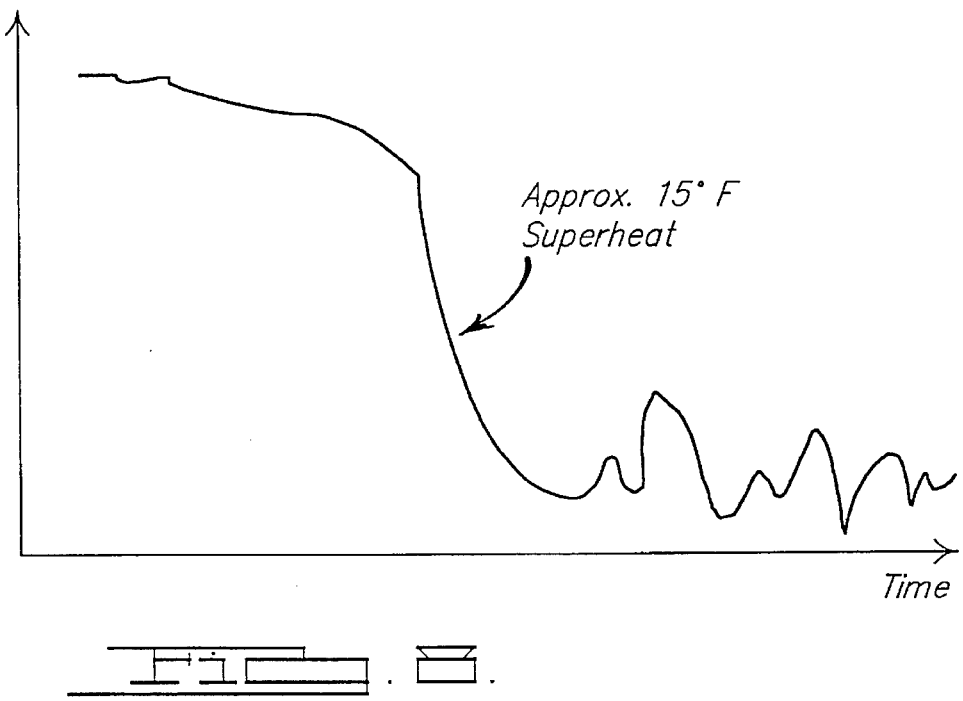
FIG. 8 is a graph depicting superheat temperature at the evaporator exit as a function of time, useful in understanding the invention in operation.
Figure 9:
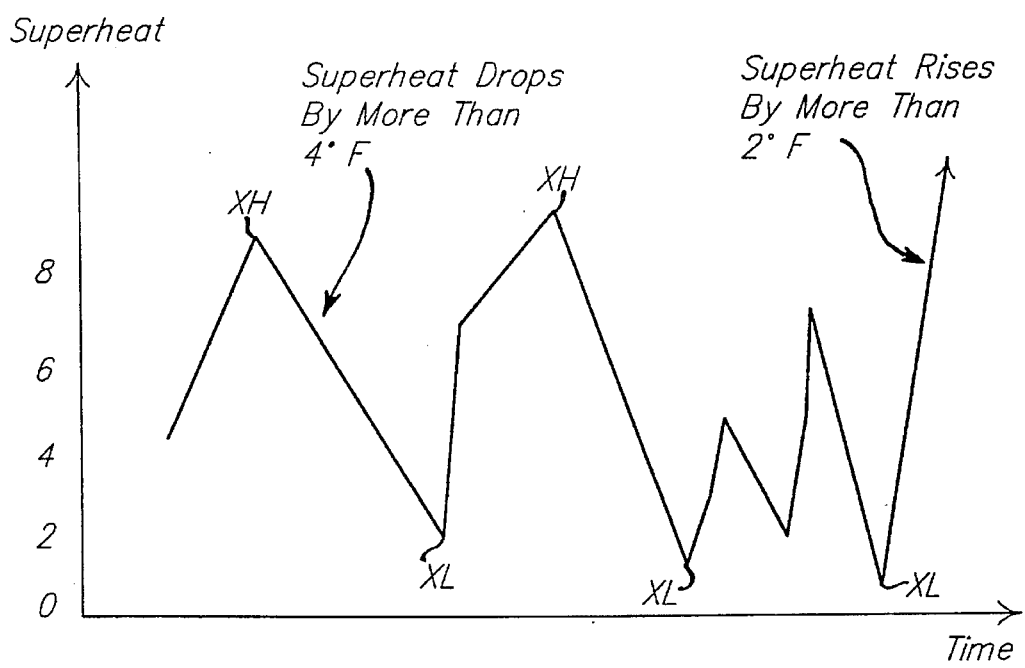

As stated above, the Min/Max routine tracks the temperature (or other parameter indicative of refrigerant energy) to determine if the settling timer should be prematurely aborted. In this regard, the Min/Max routine must take into account both steady-state and startup conditions. Referring to FIG. 8, the system superheat (absolute difference between evaporator coil inlet and outlet temperatures) is quite high when the refrigeration system is first turned on. In FIG. 8, this is depicted at A. In a refrigeration case, for example, the startup temperature at point A may be well above 50° F. This temperature steadily decreases over time until the phase change knee is reached as at B. In the present embodiment, this knee occurs at about 15° F. When the knee is reached the temperature drops rapidly to level C and then enters the fluctuating superheat region D. The Min/Max routine is designed to recognize this knee and the waveform, in order to determine when the fluctuating superheat region has been reached. Essentially, the Min/Max routine monitors the temperature drop from point A to point B and then identifies the rapid drop from point B to point C. This rapid drop is also accompanied by a drop well below 15° F. The Min/Max routine of the presently preferred embodiment is set forth in the pseudocode Appendix under the heading "Min/Max."

Referring back to FIG. 7, recall that the Min/Max routine is executed each time the loop 102–110 is executed.

Figure 9:
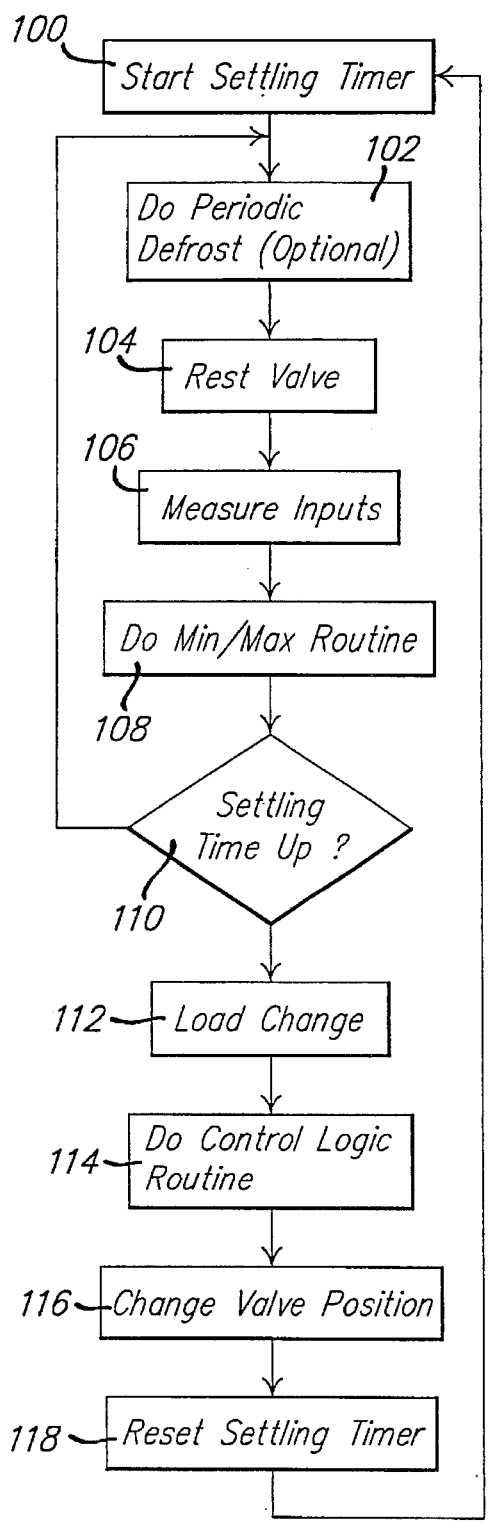
FIG. 9 is a graph depicting the change in superheat as a function of time, useful in understanding the Min/Max routine of the invention.

With reference to FIG. 9, the Min/Max routine detects and records the upper and lower limits in actual temperature excursions with each pass through the loop 102–110. These upper and lower limits represent inflection points in the fluctuating temperature data. In FIG. 9 the upper limits are designated XH and the lower limits are designated XL. In addition, the Min/Max routine also records whether the current instantaneous temperature is rising or falling vis-a-vis the preceding instantaneous temperature. The upper and lower limits are subtracted (XH - XL) to determine a Min/Max difference between any two adjacent inflection points. If the temperature is rising between the two inflection points and if the difference is greater than 2° F., then the Min/Max routine causes the settling timer to abort. Similarly, if the temperature is falling between inflection points and if the difference is greater than 4° F., then the Min/Max routine causes the settling timer to abort, as well. In this way, the Min/Max routine is more responsive to rapidly rising temperatures than it is to rapidly falling temperatures. These temperature values are also averaged over a given settling timer interval to yield an average time that is used in the subsequent control logic routine 114.

The control logic routine may or may not require a valve setting change. That will depend upon the value of the measured parameters and upon what regime the system is currently operating within. Thus the Min/Max routine, itself, does not mandate an early valve change correction. Rather, the Min/Max routine simply gives the control logic routine the opportunity to make an early valve setting adjustment.

Figure 10:
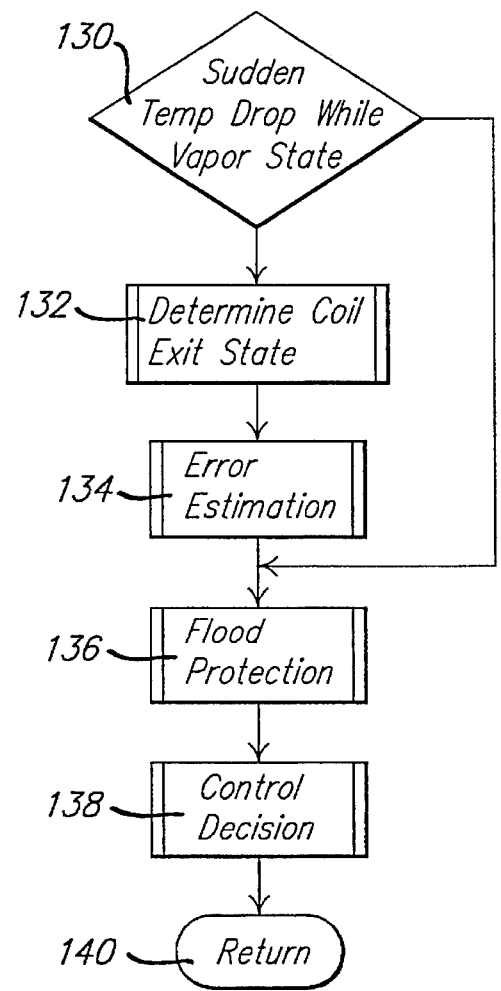
FIG. 10 is a flowchart illustrating the details of the control logic routine of the invention.
Figure 11:
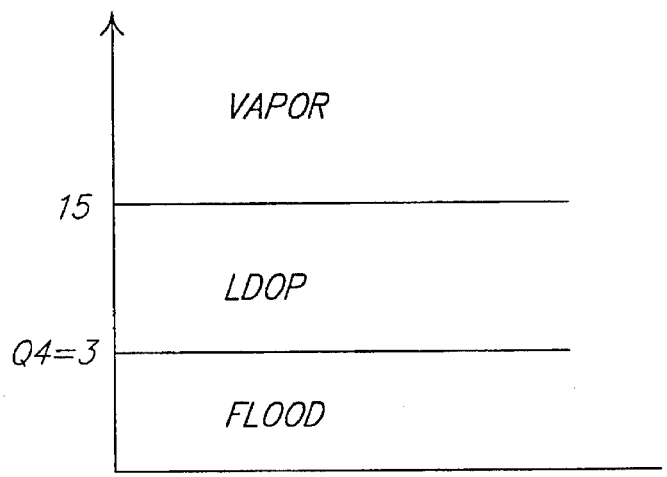
FIG. 11 is a temperature map showing the three refrigerant states detected by the invention.

Referring next to FIG. 10 an overview of the presently preferred control logic routine 114 is presented. Beginning at step 130, the procedure first checks to see if there has been a sudden drop in temperature from the all vapor state as detected by Min/Max routine. If this condition is detected, an impending flood condition may exist and control is immediately branched to step 136 where the flood protection routine is performed. Otherwise, control proceeds to step 132 where the exit state of the evaporator coil is determined. The present embodiment subdivides the temperature band into three regimes, an all vapor regime, an LDOP regime and an all liquid or flood state regime. The LDOP regime is the physical state that occurs in the fluctuating superheat region, where liquid and vapor refrigerant are both present in chaotically varying proportions. Refer to the Appendix under the heading "Coil Exit State" for a pseudocode listing of the procedure performed at step 132. Step 132 divides the system operation into three regimes illustrated in FIG. 11. Referring to FIG. 11, the presently preferred embodiment defines the vapor state as temperatures exceeding 15° F. and defines the liquid state or flood state as temperatures below 3° F. Between these two regimes is the liquid dry out point regime or LDOP regime. These values of temperatures of the regimes need not be fixed but could be allowed to float.

Referring back to FIG. 10, the control logic routine proceeds from the exit state determination (step 132) to an error estimation step 134. It is at this step that the parameters used in the composite multiplier factor are determined. The multiplier factor is ultimately used to control to what extent the expansion valve is incrementally opened or closed. A pseudocode listing of the error estimation procedure appears in the Appendix under the heading "Error Estimation." Essentially, this routine uses the current superheat reading and a previous superheat reading to establish an error value. Specifically, the superheat from a previous reading and the applicable setpoint temperature ($Q_3$) are subtracted to develop an old error value. The current superheat and the applicable setpoint ($Q_3$) are also subtracted to produce a new error value. An overall error factor is then developed by the following equation:

$$er = en + 4(en - eo);$$

where en is the new errr, eo is the old error and er is the weighted error factor.

Figure 12:
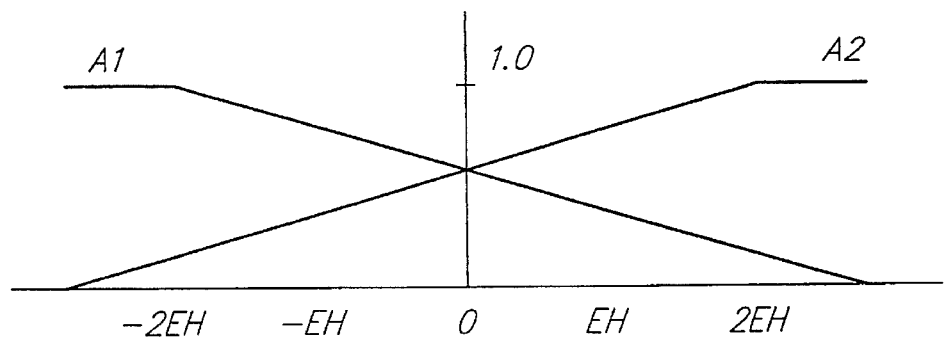
FIG. 12 is a graph describing how the parameters A1 and A2 are achieved.

The error estimation routine then uses the weighted error factor to develop multiplier values $A_1$ and $A_2$ according to the relationship graphically depicted in FIG. 12. These A parameters are used in a subsequent fuzzy logic procedure to arrive at the proper valve setting. The relationship depicted in FIG. 12 may be programmed as a lookup table or as a stepwise linear function. The parameter EH in FIG. 12 may be any suitable number and was chosen as 2.5 for this embodiment.

Figure 13:
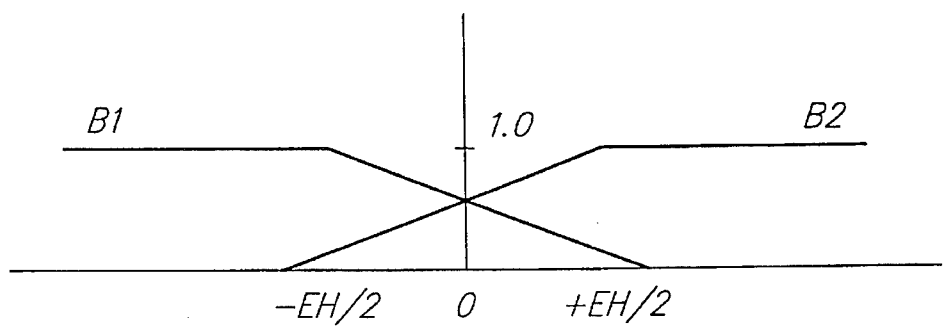
FIG. 13 is a graph illustrating how the parameters B1 and B2 are achieved.

In addition to the A parameters, the presently preferred embodiment also establishes a set of B parameters that are based on the change in error rate (the first derivative of error rate). FIG. 13 shows the relationship between error rate derivative and the $B_1$ and $B_2$ parameters.

Once the A parameters and B parameters have been determined by the error estimation step 134, control then proceeds to a flood protection routine 136. The flood protection routine is supplied to ensure that the system will not allow the refrigerant temperature to drop to the point where compressor flooding may occur. This flooding condition is particularly problematic during the initial pull-down phase of the refrigeration system. During pull-down, it is desirable for the system to lower the temperature as quickly as possible. However, rapid pull-down can result in a significant temperature undershoot below the target value, resulting in flooding.

Figure 14:
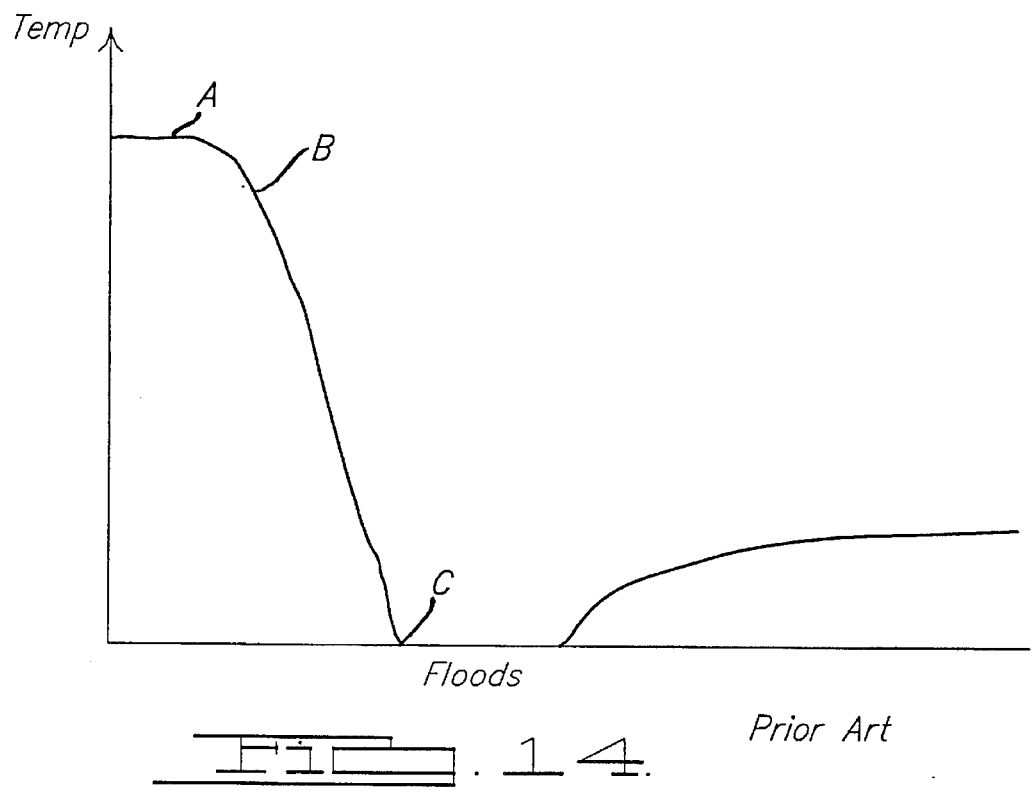
FIG. 14 is a temperature-time curve illustrating system response in a conventional system.

FIG. 14 illustrates the problem. In FIG. 14 the time-temperature curve has been labeled by points A, B and C, corresponding to similar points illustrated in FIG. 8. In a conventional system during rapid pull-down, the temperature drops rapidly at the knee (beginning at point B), resulting in flooding occurring at point C. In the conventional system flooding could occur because the system allows the temperature to undershoot below the target value.

Figure 15:
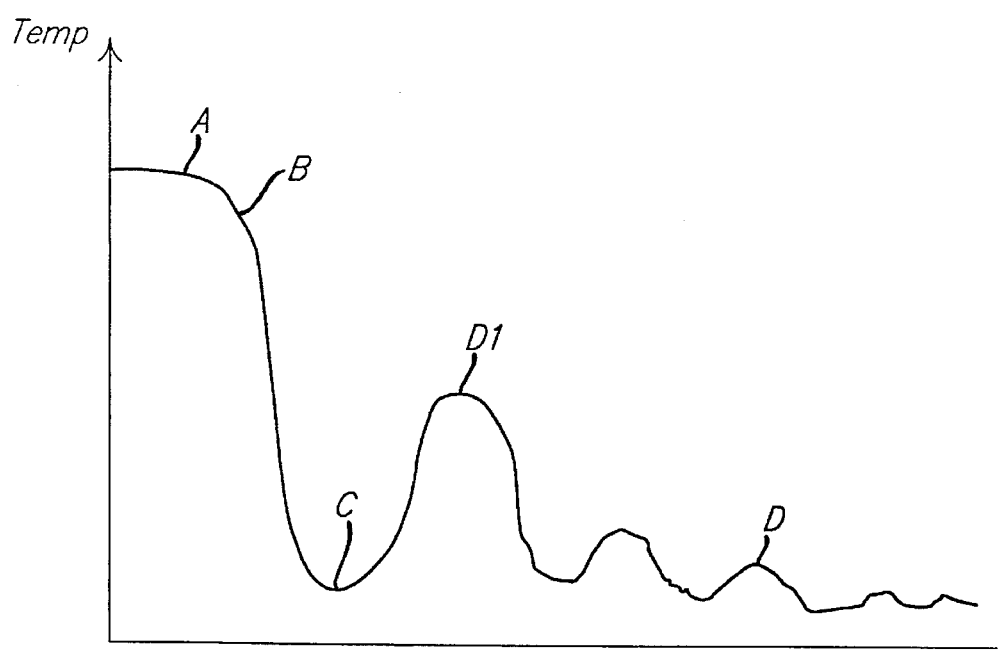
FIG. 15 is a temperature-time graph showing system response of the invention.

FIG. 15 illustrates a similar curve that results from the present invention in operation. Note that the present invention affords rapid pull-down without allowing the system to enter the flooding condition.

Figure 16:
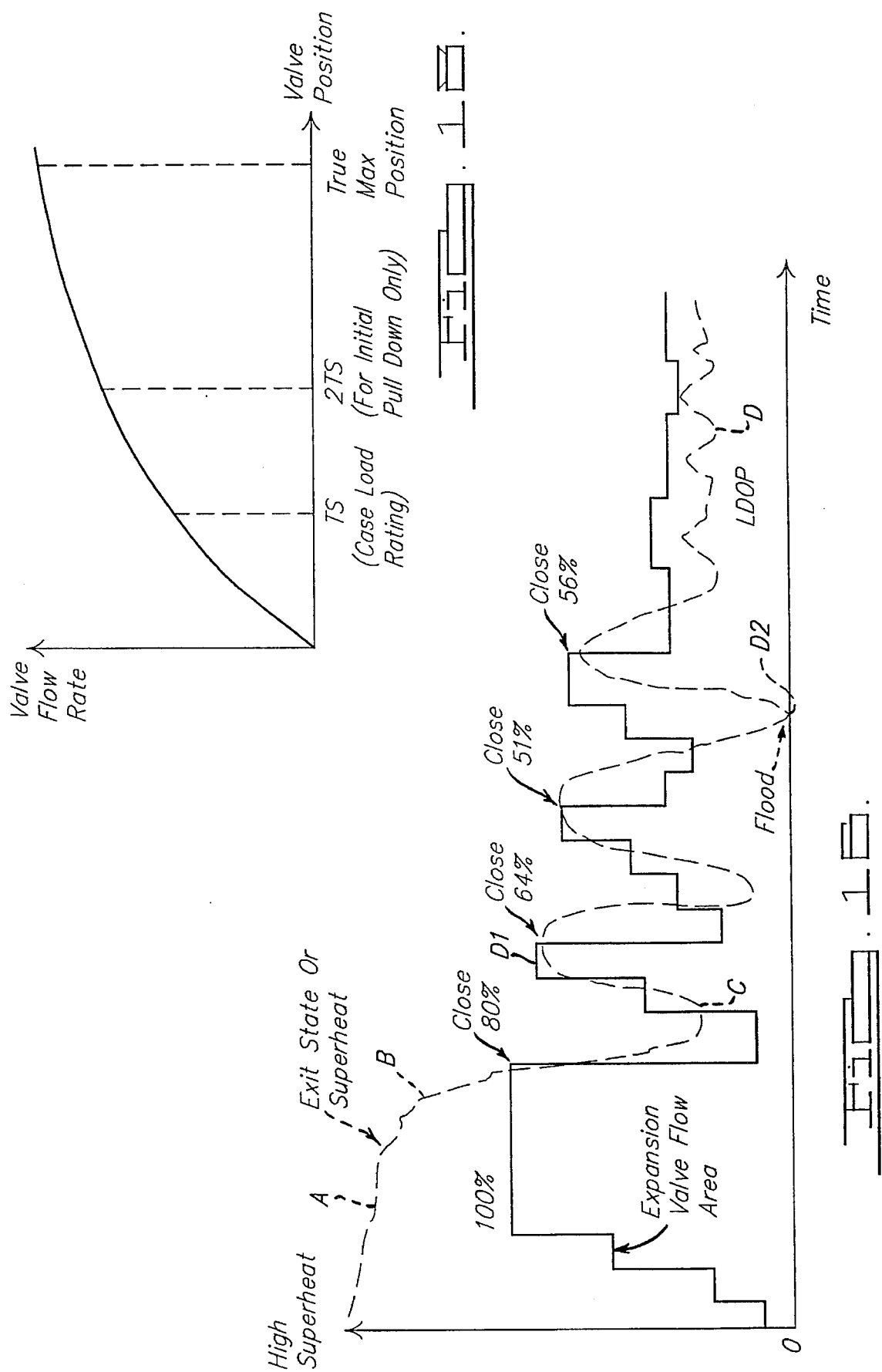
FIG. 16 is a detailed temperature-time graph showing how the flood protection routine controls the valve to avoid the flood state.

FIG. 16 shows how the flood protection routine 136 accomplishes this. The flood protection routine iterates for the percentage value by which to close the valve when triggered by the Min/Max routine. Refer also to the pseudocode Appendix under the heading "Flood Prevention" for further details. FIG. 16 shows a temperature-time curve and a valve setting-time curve that produces the temperature curve. Note that the valve setting is increased in a stepwise fashion until the knee (point B) is reached. Upon detecting the knee the valve is closed by a large single increment equal to 80% of the total steps or positions that the valve moved in the opening direction. For example, in the illustrated embodiment (FIG. 16), if a valve setting of 40 is achieved when the knee is detected, then a 32 step drop is calculated as 80% of the 40 steps. This 32 step drop is then subtracted from the peak setting resulting in a final setting of 8 steps.

Thereafter, the procedure again ramps up as before. This causes the temperature drop to change direction at C, before the flooding condition can occur. With the direction of the temperature curve reversed, temperature increases, ultimately reaching the peak at $D_1$. At $D_1$ a second pull-down iteration is commenced. As before, the valve increases in a stepwise fashion, which causes the temperature to again begin dropping. This time, when the low temperature limit is reached, the valve setting is rapidly reduced by 80% of 80% of its total opening steps since last rapid closure. Thus the valve is reduced to a setting 64% of its total steps opened. At the end of a valve closure, however, if the state should remain in the flooded state, as shown at $D_2$, the valve rapidly closes and the flood prevention algorithm corrects itself for the next closing action. Specifically, for the next rapid closing action, the algorithm increases its closing percentage by 10% more than previous. For example, in the case illustrated in FIG. 16, the valve had closed 51% of number of steps opened since the previous rapid close movement. This results in a brief period of flood state which causes the valve to take corrective action. The superheat rises, causing the valve to open; at the next instance of rapid decrease in superheat, the algorithm closes the valve 56% (i.e., 110% of 51%) of the total steps opened since the last rapid close move. As illustrated, this procedure repeats, each time oscillating between gradual valve opening and rapid valve closing, with the amount of valve closing being reduced by a predetermined percentage of the previous valve closing amount.

Referring again to FIG. 10, after the flood protection routine is performed control then proceeds to the control decision logic 138. The presently preferred embodiment uses a simple fuzzy logic control decision strategy according to the description that follows. Essentially, the control strategy generates a valve movement multiplier value that depends on three components: a vapor state component, an LDOP state component and a flood state component. The multiplier factor is then applied to the current valve setting to determine the number of steps required to achieve the desired valve setting. The presently preferred multiplier value is dictated by the equation below:

$$VM = \frac{MC\left(\frac{-TS}{AX}\right) + MZ(0) + MO\left(\frac{TS}{AY}\right)}{MC + MZ + MO}$$

In the above equation, the MC component causes a valve closing movement, the MZ component causes a valve freeze component and the MO component causes a valve opening movement. These three components are averaged, as described in the equation. In the above equation TS is the valve position as dictated by the Load Change routine. The factors AX and AY are state parameter values that vary depending on which of the three states the refrigerant at the evaporator exit is currently in. The values for the presently preferred embodiment are given in Table I below. In the above equation the variable TS is a value indicative of the current valve setting that was determined by the Load Change routine. Thus the value VM represents the result of multiplying the current valve setting with the composite multiplier factor. In the above equation the MZ factor is multiplied by 0 to denote that no valve movement should occur if the current valve setting is correct. Although the MZ component in the above equation is 0 in the numerator, the MZ factor is nevertheless present in the denominator and thus will affect the ultimate valve movement value VM.

TABLE I

| STATE | TEMP | AX | AY |
|---|---|---|---|
| vapor | >20° | 4 | 4 |

TABLE I-continued

| STATE | TEMP | AX | AY |
|---|---|---|---|
| vapor | <20° | 8 | 8 |
| LDOP | Conditioned ambient >= Setpoint | 16 | 16 |
| LDOP | Conditioned ambient < Setpoint | 8 | 8 |
| Flood | Conditioned ambient >= Setpoint | $\frac{16Sh}{Q_4}$ | $16\frac{SH}{Q_4}$ |
| Flood | Conditioned ambient < Setpoint | $8\frac{SH}{Q_4}$ | $8\frac{SH}{Q_4}$ |

Where SH = superheat temperature $Q_4 = 3°$ F.

The composite multiplier factors MC, MZ and MO are state-dependent variables that are based on a selection of the lesser of the A parameters and B parameters that were determined according to the relationships illustrated in FIGS. 12 and 13. Table II below gives the precise definition of these state-dependent variables, depending on whether the refrigerant is in the vapor state, the LDOP state or the flood state. In referring to Table II note that in Flood state the valve close parameter MC fully dominates the valve move equation (MO and MZ are set equal to zero). This causes the valve to rapidly close to avoid the flooding condition.

TABLE II

Vapor State

MC = lesser of $A_1$ and $B_1$
MZ = lesser of $Z_1^*$ and $Z_2^*$
MO = lesser of $A_2$ and $B_2$ LDOP State MC = lesser of $A_1$ and $B_1$
MZ = lesser of $Z_1^*$ and $Z_2^*$
MO = lesser of $A_2$ and $B_2$ Flood State

MC = 1
MZ = 0
MO = 0

*$Z_1$ = lesser of $A_2$ and $B_1$
$Z_2$ = lesser of $A_1$ and $B_2$

Once the valve move value VM has been determined, that value is used to change the valve setting by adjusting the valve by the number of steps indicated by the VM value. This operation is depicted at step 116 of FIG. 7. This step is executed after control returns from step 140 of the control logic routine 114. Step 140 is shown in FIG. 10 as the termination of the control logic routine.

If desired, the above control strategy can be modified to switch between the LDOP (fluctuating superheat) control of the invention and conventional superheat control. Although fluctuating superheat control provides optimal efficiency by ensuring the full use of the evaporator coil, there are times when reduced coil efficiency may be desirable. For example, if the refrigeration system is currently meeting its demand (the cooling load is being fully met), one option is to cycle the system off and wait until cooling demand is again called for. In very well insulated systems, this may be the preferred strategy. However, in a less well insulated system, cycling the system off when demand is met may not be the most overall efficient strategy. There is an energy efficiency penalty that is paid each time the system is cycled off and then back on. That penalty can be minimized by minimizing the number of times the system is required to cycle off and on.

Thus, as an alternative to cycling off when demand is met, the present invention also has the ability to switch to a less efficient control (involving higher superheat) when demand is met. In this less efficient operating mode, it may be possible to leave the system running (without cycling off and on) thereby minimizing some of the cyclic losses. The superheat may also be limited such that it does not exceed a certain safe value.

When the system switches to superheat control, the valve setting and hence refrigerant flow is dictated by a control strategy that strives to maintain conditioned ambient at a constant value. This is accomplished by changing the state of a software switch in the error estimation module 134 (FIG. 10). When switched to the conditioned ambient control strategy, the error is based on the difference between the actual conditioned ambient temperature value and the desired setpoint value and the LDOP control algorithm is not used.

Figure 17:
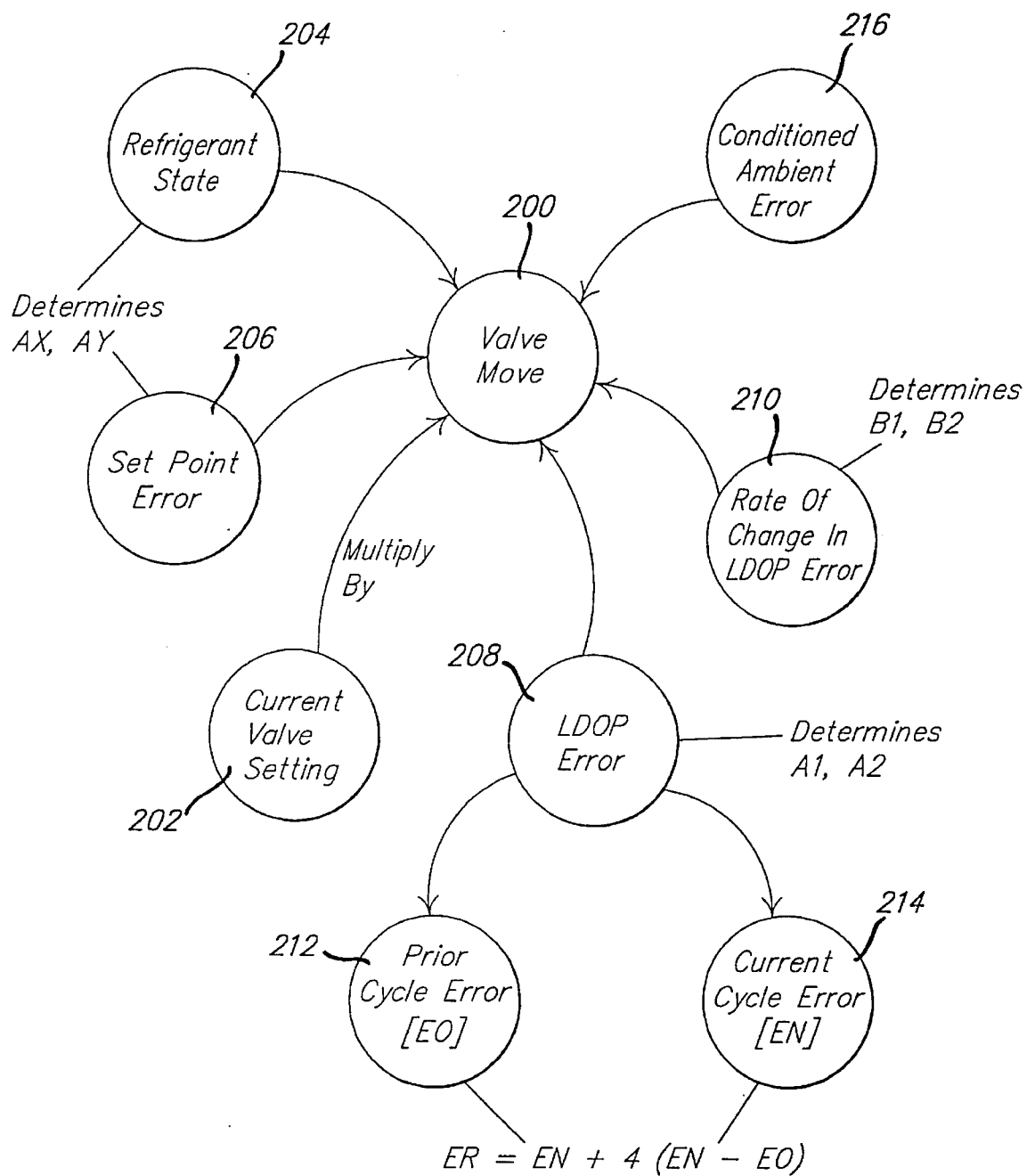
FIG. 17 is an entity relationship diagram illustrating the entities that contribute to the valve movement decision of the presently preferred embodiment.

From the foregoing it is seen that the present invention controls the refrigerant flow (i.e., valve setting) to achieve a fluctuating superheat condition. By way of overview summary, FIG. 17 presents an entity relationship diagram that shows the software components that go into the valve movement strategy. In FIG. 17 the valve movement entity is illustrated at 200. Valve movement is affected by the current valve setting (entity 202) that supplies the TS value. Refer to the load change description above for further details. Valve movement is also affected by the state of the liquid refrigerant (entity 204). In the presently preferred system this is a ternary state: vapor state, LDOP state or liquid (flooding) state. Also affecting valve movement is the error between the conditioned ambient temperature and the setpoint temperature. This is illustrated as entity 206. Entities 204 and 206 produce the AX and AY values used in the VM equation and also explained in Table I.

Valve movement is also affected by the LDOP error (fluctuating superheat error) and the rate of change in this error. These are illustrated as entities 208 and 210, respectively. Entity 208 determines the size of parameters $A_1$ and $A_2$. Entity 210 determines the size of parameters $B_1$ and $B_2$. The LDOP error represented by entity 208 is in turn based on prior cycle error (entity 212) and current cycle error (entity 214) according to the formula given in FIG. 17 and previously described.

While these are the principal entities that affect valve movement in the presently preferred system, FIG. 17 also depicts as entity 216 the presently preferred system's ability to switch to a conditioned ambient control model instead of the fluctuating superheat LDOP control model, if desired. As illustrated, this selection causes the system to use conditioned ambient error at entity 208 instead of the LDOP error. When this switch is performed, the system will strive to maintain conditioned ambient temperature at a constant value instead of striving to maintain a randomly fluctuating superheat condition.

While the invention has been described in its presently preferred form, it will be understood that certain modifications can be made to the illustrated embodiment without departing from the spirit of the invention as set forth in the appended claims.

APPENDIX

Pseudocode for Load Change $$\text{Normal\_Max\_Valve\_Position} = \frac{\text{Full\_Open\_Capacity\_of\_Valve}}{\text{Rated\_System\_Capacity}} \times 100\%$$

Valve_Load_Equilibrium_Position is Present Valve Position
IF          Valve_Load_Equilibrium_Position > Normal_Max_Valve_Position, THEN
             Valve_Load_Equilibrium_Position = Normal_Max_Valve_Position.
IF          Valve_Load_Equilibrium_Position < Normal_Min_Valve_Position, THEN
             Valve_Load_Equilibrium_Position = Normal_Min_Valve_Position.
Max_Valve_Position = 2* Normal_Max_Valve_Position.
IF          Max_Valve_Position > 100%, THEN
             Max_Valve_Position = 100%.
Notes:

1.       Normal_Max_Valve_Position is the maximum opening of valve for normal control (50%) chosen as 75 in this embodiment, for the valve used.
2.       Valve_Load_Equilibrium_Position is TS.
3.       Normal_Min_Valve_Position is usually 0%, but, chosen as 20 steps in this embodiment for the valve used.
4.       Max_Valve_Position is the maximum possible opening of valve (usually 100%), and used during pull-down.

Pseudocode for Coil Exit State:

IF        Superheat > Superheat_at_Knee, THEN
          Coil Exit State is Vapor
ELSE
          IF Superheat < Flood Superheat
             Coil Exit State is Flood
          ELSE
             Coil Exit State is LDOP
          ENDIF
ENDIF
Notes:

1.       Flood Superheat is $Q_4$.
2.       In this embodiment, the variables Superheat_at_Knee and $Q_4$, have been chosen as 15F and 3F respectively; however, they may be any appropriate value for a given system and may be adjusted or custom-fit.
3.       Superheat is Average Superheat during the settling time period.

Pseudocode for Error Estimation:

LDOP control:
IF        Continuous LDOP control, THEN
          Error = Superheat − LDOP Superheat Target
          Old Error = Old Superheat + LDOP Superheat Target
          IF (Flood Superheat + LDOP Superheat Target) > (2 * Superheat − Old Superheat) > (Flood Superheat), THEN
             Error = 0; Old Error = 0; Predicted Error = 0
          ELSE
             Predicted Error = Error + (Error − Old Error) * 4
          ENDIF
ELSE:
          Conditioned Medium Temperature Continuous Control:
          IF Conditioned Medium Temperature > (Setpoint + 5), THEN
             Error = Superheat − LDOP Superheat Target
             Old Error = Old Superheat − LDOP Superheat Target
          IF (Flood Superheat + LDOP Superheat Target) > (2 * Superheat − Old Superheat) > (Flood Superheat), THEN
             Error = 0; Old Error = 0; Predicted Error = 0
          ELSE
             Predicted Error = Error + (Error − Old Error) * 4
          ENDIF
          ELSE,
             Error = Conditioned Medium Temperature − Setpoint
             Old Error = Old Conditioned Medium Temperature − Setpoint
             Predicted Error = Error + (Error − Old Error) * 4
          ENDIF
Notes:

1.       LDOP Superheat Target is $Q_3$, chosen as 6F in this embodiment.
2.       Flood Superheat is $Q_4$, chosen as 3F in this embodiment.

Pseudocode for Flood Prevention:

IF        Sudden Change in Evaporator Exit State from Vapor to Flood is Detected (as detected by Min/Max), THEN
          IF Sudden Change Incidence is First, THEN

APPENDIX -continued

```
            Close Percent = 80%
        ELSE
        IF Evaporator Exit State After Previous Sudden Change
            Incidence was Vapor, THEN
                Close Percent = 80% of (Previous) Close Percent
            IF Evaporator Exit State After Previous Sudden Change
                Incidence was Flood, THEN
                Close Percent = 110% of (Previous) Close Percent
            IF Evaporator Exit State after Previous Sudden Change
                Incidence was LDOP, THEN
                Close Percent = 80%, (default value)
ENDIF
IF      Close Percent > 80%, THEN Close Percent = 80%
IF      Close Percent < 20%, THEN Close Percent = 20%
        Close Valve By (ClosePercent * Total Valve Opening since Previous
        Sudden Change Incidence)
Pseudocode for Min/Max:

IF      Superheat < Superheat_Low, THEN
        Superheat_Low = Superheat
        Drop = True; Rise = False; Increment Drop_Count, Decrement Rise_Count
ELSE
        IF Superheat > Superheat_High, THEN
            Superheat_High = Superheat
            Rise = True; Drop = False; Increment Rise_Count, Decrement
            Drop_Count
        ELSE
            Rise = False; Drop = False
ENDIF
IF      Valve not Already Rapidly Closed for Sudden Change Incidence AND
        Superheat is Below Superheat_Knee (15F in Embodiment), THEN
            Sudden Change Incidence = True
            Activate Rapid Close of Valve
ENDIF
IF      Rise is True AND (Superheat_High − Superheat_Low) > 2, THEN
            Abort Settling Time
IF      Drop is True AND (Superheat_High − Superheat_Low) > 4, THEN
            Abort Settling Time
Pseudocode for Min/Max:

Notes:

1.      Superheat_Low is XL in Embodiment.
2.      Superheat_High is XH in Embodiment.
```

What is claimed is:

1. A system for controlling a refrigeration apparatus of the type having a fluid refrigerant that changes state between a liquid phase at a first energy and a vapor phase at a second energy, comprising:

a flow control system for regulating the flow of refrigerant;

sensor system positioned for detecting a parameter indicative of refrigerant energy;

recognition system coupled to said sensor system for discriminating between an energy associated with a predominately liquid phase and an energy associated with a predominately vapor phase;

control system coupled to said recognition system and coupled to said flow control system for operating the flow control system such that the energy of said refrigerant at said sensor position fluctuates alternately between an energy associated with the predominately liquid phase and an energy associated with the predominately vapor phase.

2. The system of claim i wherein said refrigeration apparatus employs a heat exchanger having an inlet for introducing fluid refrigerant in the predominately liquid phase and having an outlet for discharging fluid refrigerant in the predominately vapor phase, and wherein said sensor system comprises sensor device positioned adjacent to the outlet of said heat exchanger.

3. The system of claim 2 wherein said sensor is positioned and said control system is operated such that during operation substantially the entire heat exchanger is filled with fluid refrigerant in the predominately liquid phase.

4. The system of claim 2 wherein said refrigeration apparatus employs a compressor coupled to said heat exchanger for pumping the fluid refrigerant and wherein said sensor is positioned and said control system is operated such that during operation substantially the entire heat exchanger is filled with fluid refrigerant in the predominately liquid phase and such that fluid refrigerant in the predominately liquid phase is prevented from entering said compressor.

5. The system of claim 1 wherein said flow control system comprises a compressor for pumping said refrigerant and an adjustable flow control device.

6. The system of claim 1 wherein said flow control system includes an electrically controlled flow control valve responsive to said control system.

7. The system of claim 1 wherein said flow control system includes a variable capacity compressor responsive to said control system.

8. The system of claim 1 wherein said flow control system includes an electrically controlled flow control valve and a variable capacity compressor both responsive to said control system.

9. The system of claim 1 wherein said sensor system includes at least one temperature sensor.

10. The system of claim 1 wherein said sensor system includes at least one pressure sensor.

11. The system of claim 1 wherein said control system is coupled to said flow control system to establish closed loop feedback control of said refrigerant flow.

12. The system of claim 1 wherein said recognition system includes energy peak detection system.

13. The system of claim 1 wherein said recognition system includes energy peak detection system coupled to said flow control system for detecting energy fluctuations not directly correlated to the operation of said flow control system.

14. The system of claim 1 further comprising system for detecting sudden change in refrigerant energy and for rapidly decreasing flow to avoid a flood condition.

15. The system of claim 1 further comprising system for iteratively controlling the change in refrigerant flow in response to sudden drop in refrigerant energy.

16. The system of claim 1 further comprising sensor for measuring conditioned ambient temperature and wherein said control system includes means for switching between control based on fluctuating refrigerant energy and control based on comparison of ambient temperature with a setpoint temperature.

17. The system of claim 1 further comprising sensor for measuring conditioned ambient temperature and wherein said control system includes means for operating at reduced efficiency in response to measured conditioned ambient temperature.

18. A method for controlling the flow of refrigerant in a refrigeration apparatus of the type at least one refrigerant energy sensor and having a fluid refrigerant that changes state from a liquid state at a first energy to a liquid state at a second energy, with an intermediate chaotic transition state between the liquid state and the vapor state, comprising:

ascertaining a first value indicative of the state of the refrigerant at said energy sensor during a first time interval while obtaining a second value indicative of the error between the average energy of the refrigerant at said energy sensor during a first time interval and the average energy of the refrigerant at said energy sensor during a time interval prior to said first time interval;

operating a flow control mechanism to control the flow of refrigerant based on a control factor determined from said first and second values, as follows:

using said first value to identify the operating regime as being one of the following: a vapor state, an LDOP state and a flood state;

using said first and second values to determine a flow rate control factor that causes said flow of refrigerant: (a) to increase at a first rate when operating in the vapor state (b) to decrease at a second rate when operating in the flood state and (c) to fluctuate between increasing and decreasing when operating in said LDOP state, such that refrigerant flow seeks said LDOP state at said energy sensor.

19. The method of claim 18 further comprising ascertaining a third value indicative of the rate of change of said error between said prior time interval and said first time interval; and using said third value to selectively alter said flow rate control factor.

20. The method of claim 18 further comprising ascertaining a fourth value indicative of system demand;

selectively using said fourth value to alter said control factor such that under predetermined conditions said fourth value permits said refrigerant flow to seek the vapor state as needed to satisfy system demand.

21. The method of claim 18 wherein said second value is ascertained by sampling a property indicative of energy at a plurality of times during a time interval preceding said first time interval and calculating a starting average of said sampled property; next sampling said property a plurality of times during said first time interval and calculating a first interval average; then comparing said starting average and said first interval average to determine the error.

* * * * *

UNITED STATES PATENT AND TRADEMARK OFFICE
CERTIFICATE OF CORRECTION

PATENT NO. : 5,502,970
DATED : April 2, 1996
INVENTOR(S) : Natarajan Rajendran

It is certified that error appears in the above-indentified patent and that said Letters Patent is hereby corrected as shown below:

Column 4, line 38, delete ".".

Column 9, line 20, "Al though" should be -- Although --.

Column 11, line 5, "errr" should be -- error --.

Column 13, line 11, "16Sh" should be -- 16SH --.

Column 14, line 45, after "B$_2$" insert -- . --.

Column 15, line 4, "x" should be -- * --.

Column 15, line 42, "+" should be -- - --.

Column 17, line 63, "i" should be -- 1 --.

Signed and Sealed this

Fourteenth Day of January, 1997

*Attest:*

BRUCE LEHMAN

*Attesting Officer*   *Commissioner of Patents and Trademarks*